April 3, 1956 — L. T. ULFSTEDT — 2,740,722
PROCESS FOR MANUFACTURING LIGHT-WEIGHT CONCRETE
Filed Nov. 25, 1952
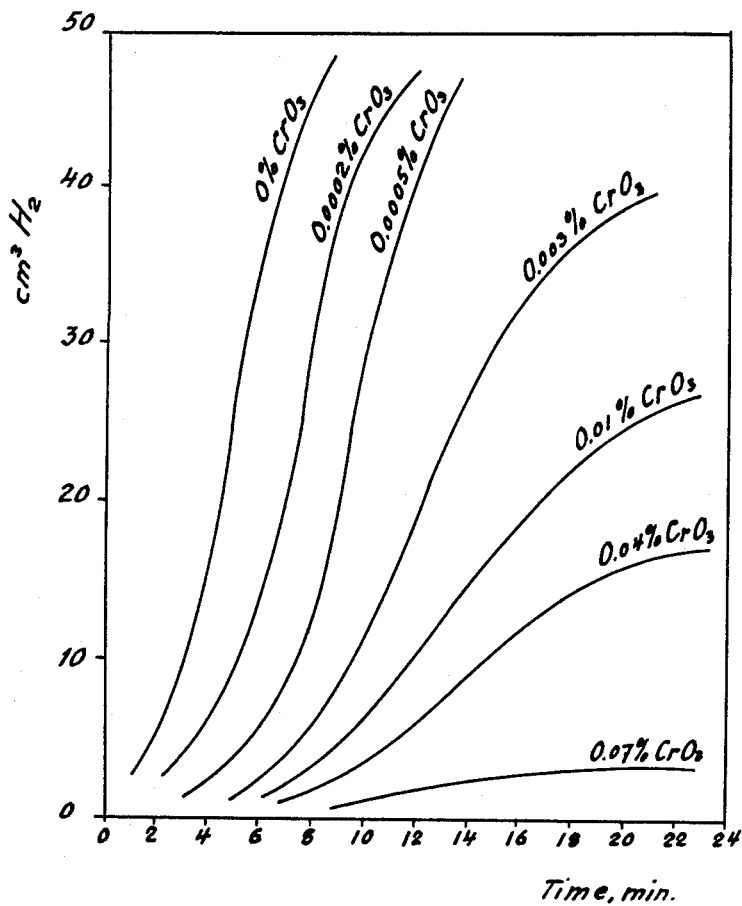
The reactivity of 0.07 g Al-powder in 50 cm³ water and 50 g cement with various Chromate contents.
L. T. Ulfstedt
By Henry C. Parker
Atty.

United States Patent Office 2,740,722
Patented Apr. 3, 1956

2,740,722
PROCESS FOR MANUFACTURING LIGHT-WEIGHT CONCRETE

Leo Torsten Ulfstedt, Sodertalje, Sweden, assignor, by mesne assignments, to Casius Corporation Limited, Montreal, Quebec, Canada Application November 25, 1952, Serial No. 322,458

3 Claims. (Cl. 106—87)

This invention concerns the manufacture of porous light-weight concrete from a raw material mixture comprising a binder rich in lime, mineral non-hydraulic aggregate and water, in which the porosity is produced by means of pulverized aluminimum reacting with said mixture and developing hydrogen therein.

As is well known, the reaction of the aluminium powder in the alkaline mixture often proceeds very tardily which has an unfavourable influence on the quality of the concrete. It is namely of great importance, in order to obtain a satisfactory pore-structure and as a consequence thereof a high quality of the product in regard to strength properties, water absorption and frost-resistance that the gas-developing reaction be finished before the mass has become too stiff, due to the setting reactions of the binder. This is of particular importance in case of reinforced light-weight concrete, as in this case the consistency of the concrete mass should be such that a satisfactory embedding and enclosure of the reinforced irons is obtained.

It has been proposed to accelerate the reaction of the aluminium by increasing the alkalinity of the mass, for example by addition of sodium hydroxide. Sometimes such as addition has a favourable effect, although generally less than might have been expected from a theoretical point of view; in other cases there is no effect at all. It is also to be observed in this connection that addition of a great quantity of alkali is not advisable, due to the occurrence of "efflorescence" in the building material produced from the mass.

Further it has been proposed to improve the development of hydrogen by grinding the aluminium down to a very high degree of fineness, in order to increase the reaction-surface of the metal. This has sometimes had the desired effect, sometimes not. Moreover, the addition of such finely ground aluminium powder is accompanied by an undesirable effect, namely the formation of small and incompletely developed pores, which has an unfavourable influence on the quality of the product.

According to the present invention it is possible, in a simple and effective manner, to improve the reaction-capacity of the aluminium powder, especially in cases where the older methods have proved to be more or less impracticable. The experimental investigations on which the invention is based have simultaneously given the answer to the question why it has not previously been possible to establish constant relations between the velocity of development of hydrogen on the one hand, and the alkalinity of the reaction-milieu, the fineness of the metal powder etc., on the other hand.

It has namely been found that the raw material from which light-weight concrete is generally produced very often contains oxidizing substances, especially anions from the groups V and VI of the periodic system, such as vanadates, molybdates and particularly chromates. Generally it is the binder, for example lime, which contains such substances. However, also the Portland cement may contain such substances originating from impurities in the raw material from which the cement has been produced. Most common is perhaps the case where the Portland cement clinker has absorbed chromium from the refractory lining of the cement furnace or kiln, which lining very often consists of chromium-magnesite bricks. In the latter case the chromium is present in the cement in the form of easily soluble compounds.

The drawing illustrates the difference in reactivity of the aluminum powder with variations in the amount of chromium trioxide present in the cement.

These oxidation substances exercise such a passivating effect on the aluminium powder that in case of large concentrations of said substances the reaction-capacity of the aluminium is completely inhibited, while in case of lower contents thereof a more or less accentuated retardation is observed. The concentrations which are still active are extremely low. As will be seen from the accompanying drawing, a chromate content of 0.07% in cement practically prevents development of hydrogen. Even so low a content of $CrO_3$ as 0.0002%, which figure is often exceeded in common cement, in some cases to the 10th power, has an obvious effect on the hydrogen development.

According to the invention it is possible to completely remove the difficulties caused by the oxidizing substances by adding to the light-weight concrete mixture a ferrous compound, which reduces the oxidizing anions in the liquid phase and thus neutralizes the injurious action thereof, for example ferrous chloride or ferrous sulphate. Even solid ferrous compounds, such as ferrous hydroxide, have the desired effect, but must be added in excess.

The best result is obtained when the ferrous ions are supplied in the form of an aqueous solution of a ferrous salt, for example ferrous chloride or ferrous sulphate. The addition of the solution is made preferably after the mixing together of the lime-containing binder and the mineral aggregate has taken place. After addition of the ferrous compound the mixture is stirred for some time, whereupon the aluminium powder may be added to the mixture which is now free from injurious oxidizing substances. When working in this manner no addition of the ferrous compound in excess is required, but an amount equivalent to the present oxidizing anions is sufficient to completely eliminate the passivating effect on the aluminium powder.

The addition of the ferrous compound has no undesirable and injurious effect, and the light-weight concrete manufactured according to the invention may be treated in the usual manner, for example subjected to a steam-curing at temperatures exceeding 120° C.

I claim:

1. In a process for manufacturing porous light-weight concrete from a raw material mixture comprising binders rich in lime, mineral non-hydraulic aggregate, water and aluminium powder acting as porosity producing agent by developing hydrogen in the mixture, said mixture containing as impurities oxidizing substances having a retarding influence on the development of hydrogen, said oxidizing substances being within the group consisting of chromates, vanadates, and molybdates; the combination therewith of the steps of initially adding to a raw material mixture comprising binders rich in lime, mineral non-hydraulic aggregate and water, a ferrous compound to reduce said oxidizing substances to a lower state of valency and subsequently adding the aluminum whereby the hydrogen developing reaction thereof is promoted and accelerated.

2. The process of claim 1, wherein the ferrous compound is added in the form of an aqueous solution of a ferrous salt.

3. The process of claim 1, wherein the ferrous compound is selected from the group consisting of ferrous chloride and ferrous sulphate.

References Cited in the file of this patent

FOREIGN PATENTS

| | | |
|---|---|---|
| 306,444 | Great Britain | Oct. 17, 1929 |
| 240,868 | Great Britain | Oct. 5, 1925 |

OTHER REFERENCES

Mellor, J. W.: "A Comprehensive Treatise on Inorganic and Theoretical Chemistry," Longmans, Green and Co., London (1931), vol. 11, pages 229 and 237.

Lea and Desch: "The Chemistry of Cement and Concrete," Edward Arnold and Co., London (1935), page 269.